United States Patent
Zhang (10) Patent No.: US 11,095,739 B2
(45) Date of Patent: Aug. 17, 2021

(54) NOTIFICATION COLUMN MESSAGE PROCESSING METHOD AND DEVICE

(71) Applicant: TENCENT TECHNOLOGY (SHENZHEN) COMPANY LIMITED, Guangdong (CN)

(72) Inventor: Xing Hua Zhang, Shenzhen (CN)

(73) Assignee: TENCENT TECHNOLOGY (SHENZHEN) COMPANY LIMITED, Shnezhen (CN)

( * ) Notice: Subject to any disclaimer, the term of this patent is extended or adjusted under 35 U.S.C. 154(b) by 188 days.

(21) Appl. No.: 15/982,495

(22) Filed: May 17, 2018

(65) Prior Publication Data

US 2018/0295200 A1    Oct. 11, 2018

Related U.S. Application Data

(63) Continuation of application No. PCT/CN2017/085435, filed on May 23, 2017.

(30) Foreign Application Priority Data

May 24, 2016 (CN) .......................... 201610349340.4

(51) Int. Cl.
*G06F 15/16* (2006.01)
*H04L 29/08* (2006.01)
*G06F 9/54* (2006.01)

(52) U.S. Cl.
CPC .............. *H04L 67/26* (2013.01); *G06F 9/542* (2013.01)

(58) Field of Classification Search
CPC ......... H04L 67/26; H04L 51/14; H04L 51/24; H04L 51/26; G06F 9/542; G06F 9/451; H04M 1/72547
See application file for complete search history.

(56) References Cited

U.S. PATENT DOCUMENTS

| 2012/0204191 | A1* | 8/2012 | Shia ....................... G06Q 10/10 719/318 |
| 2013/0173757 | A1* | 7/2013 | Peng ................... H04L 12/1859 709/219 |
| 2014/0089848 | A1 | 3/2014 | Smith et al. |

(Continued)

FOREIGN PATENT DOCUMENTS

| CN | 103973875 A | 8/2014 |
| CN | 104238878 A | 12/2014 |

(Continued)

OTHER PUBLICATIONS

International Search Report of PCT/CN2017/085435 filed Aug. 3, 2017.

(Continued)

*Primary Examiner* — John B Walsh
(74) *Attorney, Agent, or Firm* — Sughrue Mion, PLLC (57) ABSTRACT

A method and a device for processing a notification bar message are provided. The method includes detecting a target message received by a terminal notification bar. A target interface identifier contained in the target message is acquired, and a type of the target message is determined based on the target interface identifier. The target message is displayed in the notification bar using a display mode according to the type of the target message.

20 Claims, 6 Drawing Sheets

(56) References Cited

U.S. PATENT DOCUMENTS

| | | | | |
|---|---|---|---|---|
| 2016/0253070 | A1* | 9/2016 | Rolih | G06F 3/04842 |
| | | | | 715/835 |
| 2017/0099592 | A1* | 4/2017 | Loeb | H04L 67/303 |
| 2017/0142213 | A1* | 5/2017 | Golde | G06F 8/61 |
| 2018/0183651 | A1* | 6/2018 | Liu | H04W 52/0258 |
| 2018/0270180 | A1* | 9/2018 | Chen | G06F 17/2765 |

FOREIGN PATENT DOCUMENTS

| | | |
|---|---|---|
| CN | 104579847 A | 4/2015 |
| CN | 105450505 A | 3/2016 |
| CN | 105786313 A | 7/2016 |
| CN | 106095463 A | 11/2016 |

OTHER PUBLICATIONS

Communication dated Dec. 31, 2019 from the State Intellectual Property Office of the P.R.C in application No. 201610349340.4.
Written Opinion of the International Searching Authority dated Aug. 3, 2017 in International Application No. PCT/CN2017/085435.

\* cited by examiner

| Push target jump | Package name of application that generates push | Push copy | Whether it is resident on the notification bar | PushId |
|---|---|---|---|---|
| Push target jump | Package name 1 | Copy 1 | TRUE | pushId1 |
| | Package name 2 | Copy 2 | FALSE | pushId2 |
| | Package name 3 | Copy 3 | TRUE | pushId3 |
| | ...... | ...... | ...... | ...... |
| | Package name n | Copy n | FALSE | pushId4 |

NOTIFICATION COLUMN MESSAGE PROCESSING METHOD AND DEVICE

This application is a continuation of International Patent Application No. PCT/CN2017/085435 filed May 23, 2017, which claims priority from Chinese Patent Application No. 201610349340.4, entitled "Method and Device for Processing Notification Bar Message" filed in the Chinese Patent Office on May 24, 2016, the disclosures of each of which are incorporated by reference herein in their entirety.

BACKGROUND

1. Field

The present disclosure relates to the field of communications technology, and more particularly, to a method and a device for processing a notification bar message.

2. Description of Related Art

With popularity and development of intelligent terminals, a terminal notification bar, as a user interaction location, becomes more and more important. However, various applications installed and used on terminals by users usually push various messages to the terminal notification bar, and the messages may come from either applications themselves, or various software development kits (SDK) integrated with the applications. Since various applications are all sending various messages endlessly, the notification bar of a user will be easily fully occupied, which not only disturbs the user greatly, but also is quite inconvenient for a user to find useful push messages.

SUMMARY

It is an aspect to provide a method and a device for processing a notification bar message such that a type of a target message may be determined according to a target interface identifier corresponding to a jump interface of the target message, and the accuracy rate is high.

According to an aspect of one or more example embodiments, there is provided a method. The method includes detecting a target message received by a terminal notification bar. A target interface identifier contained in the target message is acquired, and a type of the target message is determined based on the target interface identifier. The target message is displayed in the notification bar using a display mode according to the type of the target message.

According to other aspects of one or more example embodiments, there is also provided a device and a non-transitory computer readable storage medium corresponding to the method.

BRIEF DESCRIPTION OF THE DRAWINGS

Example embodiments will be described below with reference to the accompanying drawings, in which.

DETAILED DESCRIPTION

The following clearly and completely describes the technical solutions in the example embodiments with reference to the accompanying drawings in which the example embodiments are shown. The described example embodiments are some of the example embodiments rather than all of the example embodiments. All other example embodiments obtained by a person of ordinary skill in the art based on the example embodiments without creative efforts shall fall within the protection scope of the present disclosure and the appended claims.

In the related art, in order to manage push messages, the terminal may identify push types on the basis of push message content in the notification bar, and then display the push messages according to the types of the push messages. Although this related art method achieves the purpose of classifying and managing push messages according to types, the following problems still remain unsolved. That is, valid information cannot be extracted from the content of a push message that is short, resulting in difficulty in performing type identification, and furthermore, some push messages are only a picture without text information, and cannot be easily classified according to the content.

In the example embodiments, a target message received by a terminal notification bar is detected, a target interface identifier contained in the target message is acquired, a type of the target message is determined according to the target interface identifier, a target message is displayed in the notification bar according to the type of the target message, and the method determines the target type of the target message according to a target interface identifier corresponding to the jump interface of the target message, does not limit the existence form of the target message, and has a high accuracy rate.

The method for processing a notification bar message disclosed by the example embodiments will be described in detail with reference to FIG. 1-FIG. 5.

Figure 1:
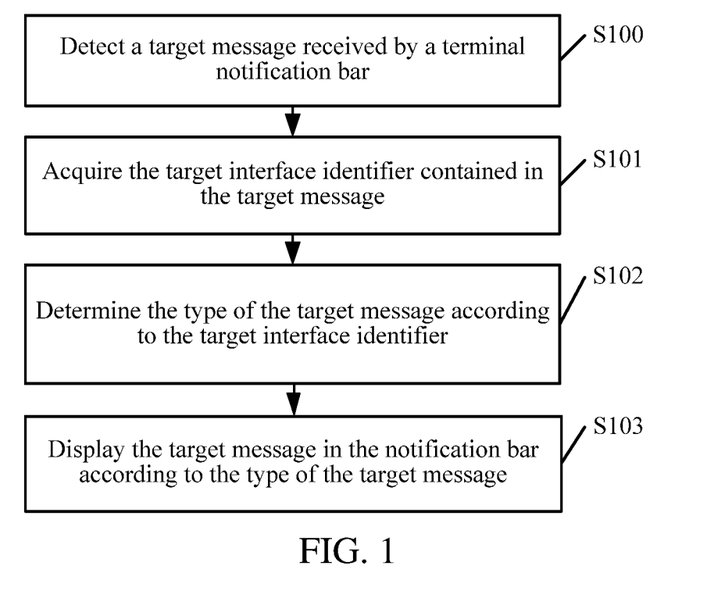
FIG. 1 is a flow chart of a method for processing a notification bar message according to an example embodiment.

Referring to FIG. 1, FIG. 1 is a flow chart of a method for processing a notification bar message according to an example embodiment. The method includes steps S100-S103:

S100: Detect a target message received by a terminal notification bar.

Various applications installed in a terminal may push a message to a notification bar of the terminal (the message is also called as target message in the present disclosure), and the message may include text information, pictures or network link, so as to trigger a user to click interested content. It should be noted that, the target message may be either a push message relating to an application of the terminal, or a push message relating to SDK integrated with the terminal.

In this example embodiment, the terminal may be a portable terminal device or a mobile terminal device such as a mobile phone, a PAD (tablet PC), and an intelligent wearable device. Application programs may be installed and running in the terminal, and include, but not limited to, SNS (Social Networking Services) application programs and instant communications application programs.

S101: Acquire the target interface identifier contained in the target message.

The target message is usually configured to exhibit relatively short information and attracts the attention of a user, so as to guide the user to a specific functional interface. The user may click or delete the target message displayed in the terminal notification bar, and when the user clicks the target message displayed in the notification bar, the terminal will automatically jump to the functional interface (that is, the target interface or jump target interface) corresponding to the message. One example of the functional interface is webpage.

When it is detected that the terminal notification bar receives the target message, the target interface identifier corresponding to the target interface that will be jumped to and determined by the target message is acquired, and the target interface identifier may include a package name and a type name of the target interface. The target interface identifier is usually contained in the target message.

For an Android operating system, such target jump is packaged into a PendingIntent structure, which stores Intent that will be trigged when the user triggers clicking and canceling of the push message. For a push message, no matter which application is the sender, the identity of the application that pushes the message may possibly be changed, but the target jump corresponding to the message will not be changed. Therefore, the target jump of the push message may be judged as a main factor of classifying the type of the push message.

An example that applications send push messages to one another is taken for further description. A terminal is installed with an application A and an application B, the manufacturers of the application A and the application B cooperate with each other, and the messages pushed by the application A and the application B all jump to a functional interface of the application B. Therefore, the source of a certain push message received by the notification bar may be either the application A or the application B. However, no matter who sends the message, the message will finally jump to the functional interface in the application B. Therefore, this example embodiment acquires the target interface identifier of the functional interface contained in the push message.

Furthermore, in some example embodiments, which application sends the push message may be distinguished according to the package name in the target interface identifier.

S102: Determine the type of the target message according to the target interface identifier.

In this example embodiment, matching may be performed between the target interface identifier and at least one preset interface identifier in the preset rule library, and the message type corresponding to the preset interface identifier that matches is determined as the type of the target message (the type is also called as the target type in the present disclosure).

The preset rule library includes a correspondence relationship between preset interface identifiers and message types. It should be noted that, each correspondence relationship may be a first correspondence relationship or a second correspondence relationship. The preset interface identifier in the first correspondence relationship matches the interface identifier contained in the push message relating to the application installed in the terminal; the preset interface identifier in the second correspondence relationship matches the interface identifier contained in the push message relating to the SDK integrated with the terminal. Therefore, if the target interface identifier matches the preset interface identifier of the first correspondence relationship, it may be determined that the target message is the push message of the application installed in the terminal; if the target interface identifier matches the preset interface identifier of the second correspondence relationship, it may be determined that the target message is a push message of the SDK integrated with the terminal.

The correspondence relationships in the preset rule library may all be the first correspondence relationships, or may be all the second correspondence relationships, or may include both the first correspondence relationships and the second correspondence relationships. It should be noted that, the first correspondence relationship and the second correspondence relationship in this example embodiment are only for distinguishing types of the correspondence relationships, the first correspondence relationship and the second correspondence relationship are distinguished in the preset rule library mainly to determine the initial source of a certain push message, that is, whether it comes from an application or SDK.

The type of the message in the preset rule library corresponding to the preset interface identifier that matches the target interface identifier is determined as the type of the target message.

The type of the push message may be classified according to various standards, for example, firstly, according to whether a push message is resident in the notification bar, the push message may be classified as a resident type and a cleanable type; then, further according to the use of the push message, the push message may be classified as a system type, a function type, an information type, an instant communications type, and an advertisement type, and each type further has the following small types:

| | |
|---|---|
| System type | electricity, network, storage space, privilege, safety |
| Function type | reminding, commission, mail, weather, road condition, navigation, finance, schedule, application update, download |
| Information type | news, read, video, information |
| Instant communications type | short message, instant communications message, social trends, commend reminding |
| Advertisement type | advertisement, sales promotion, recommendation |

In some example embodiments, the types of the push messages in this example embodiment may be either the small types or the large types (that is, system type, function type, information type, instant communications type, and advertisement type) in the aforementioned table.

S103: Display the target message in the notification bar according to the type of the target message.

In this example embodiment, different types of target messages are corresponding to different display modes, and a target message may be displayed in the notification bar according to the target type of the target message, for example, folded display and separately display. It should be noted that display modes corresponding to different types are set in advance.

In some example embodiments, step S104 may be further performed before the target message is displayed according to the type of the target message;

S104: Determine a display priority level corresponding to the type of the target message.

The display priority level may include high priority level or low priority level.

In this example embodiment, displaying the target message in the notification bar according to the type of the target message specifically includes:

combining, folding, and displaying the target message and other messages in the notification bar if the display priority level corresponding to the type of the target message is a low priority level, wherein the type of the other message is the same as the type of the target message;

directly displaying the target message in the notification bar if the display priority level corresponding to the type of the target message is a high priority level.

In this example embodiment, priority levels corresponding to different types are set in advance. For example, push messages of the advertisement and information types that often disturb a user have a low priority, the priority levels of the instant communications, system and function types are high. It should be noted that, if the type of a target message is a small type under the large types such as the system, function, information, instant communications, and advertisement types, when the priority level is determined, the large type corresponding to the small type of the target message needs to be determined, so as to determine the priority level of the type of the target message.

In this example embodiment, the aforementioned steps may be performed by a terminal, or a terminal and a server through cooperation (the terminal and the server are connected via network). In a case that a terminal and a server cooperate, some steps are performed by the terminal and some steps are performed by the server, for example, the server performs steps 102 and step 104, and the other steps are performed by the terminal.

In this example embodiment, a terminal may report operations made by a user on a push message to a server, and the server adjusts the priority levels of each type according to the statistics of the use state of a user. For example, when a lot of users select to cancel (not care about) a certain type of push messages, the priority level of the type of push messages is lowered; when a lot of users select to click (care about) a certain type of push messages, the priority level of the type of push messages is raised. When the priority levels of each type are adjusted, a percentile measure may be used, and the value is the percentage of users caring about the type of push messages, and ranges from 0-100. When the percentage of users caring about a certain type of push messages is larger than a preset threshold (for example, 50%), the priority level of the type of push messages is raised. The server sends the priority levels of each type that are re-determined to the terminal.

If the display priority level corresponding to the type of the target message is a low priority level, the target message and other messages are combined to be folded and displayed in the notification bar, combining to be folded and displayed is combining the target message and other messages in one notification bar to be displayed, the notification bar only displays the total number of the target message and other messages and the applications or SDK from which the messages are, and only when the user clicks the notification bar, the content of each message will be displayed separately.

If the display priority level corresponding to the type of a target message is a high priority level, the target message is displayed in the notification bar directly, that is, the content of the target message is displayed in the notification bar, and the user may acquire the content of the target message from the notification bar directly.

In some example embodiments, the method for processing a notification bar message may be performed and implemented by a third-party application management type application program. In some example embodiments, the push messages relating to SDK are pushed by SDK associated applications.

In this example embodiment, a target message received by a terminal notification bar is detected, a target interface identifier contained in the target message is acquired, a type of the target message is determined according to the target interface identifier, a target message is displayed in the notification bar according to the type of the target message, and the method determines the target type of a target message according to the target interface identifier, does not limit the existence form of the target message, and has a high accuracy rate.

Figure 2:
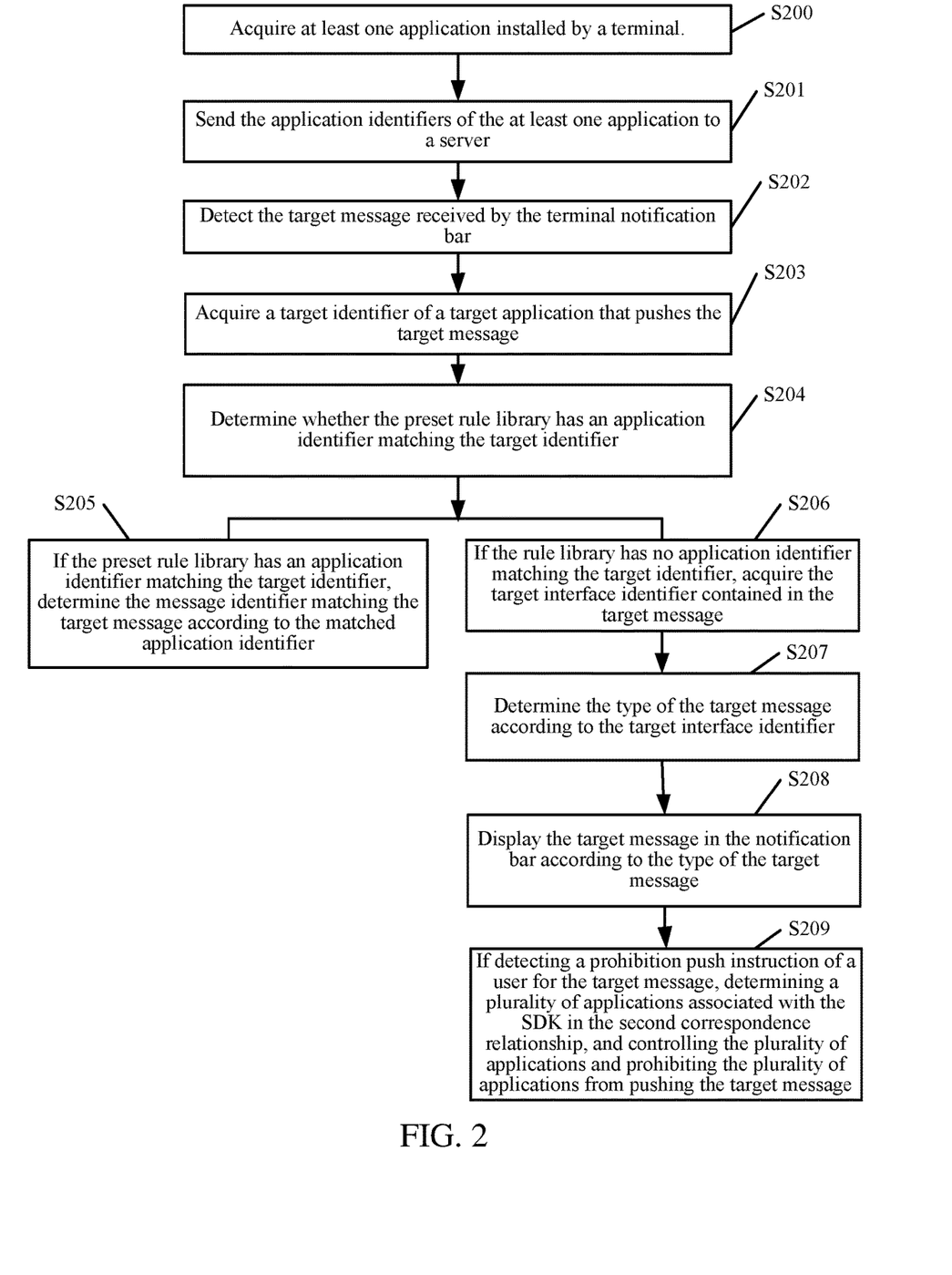
FIG. 2 is a flow chart of another method for processing a notification bar message according to an example embodiment.

Referring to FIG. 2, FIG. 2 is a flow chart of another method for processing a notification bar message according to an example embodiment. As shown in FIG. 2, the method for processing a notification bar message in this example embodiment includes steps S200-S209.

S200: Acquire at least one application installed by a terminal.

In this example embodiment, an application list that has been installed in a terminal is acquired according to a system interface, and the application list includes at least one application.

In some example embodiments, the terminal has a notification management tool application program, after the notification management tool application program is started, the application list that has been installed in the terminal is acquired according to the system interface, and the application list includes at least one application.

S201: Send the application identifiers of the at least one application to a server, so that the server establishes a preset rule library, wherein the preset rule library includes at least one first correspondence relationship of each of the at least one application and a second correspondence relationship of SDK associated with a plurality of applications among the at least one application.

In this example embodiment, the terminal sends the application identifier of at least one application in the application list to the server, so that the server establishes the preset rule library, and the application identifier may be the package name of the application.

The server stores a lot of correspondence relationships between interface identifiers (that is, Push jump targets) and message types. In some example embodiments, besides the Push jump targets and message types, the correspondence relationship may include the following content: package name, identifiers of push messages (Push id), whether a push message is sent by SDK, and default suggestion. In some example embodiments, the correspondence relationship may be organized according to the following table:

| Push jump target | package name list | type | default suggestion | push message Push id | whether a is sent by SDK |
| --- | --- | --- | --- | --- | --- |

In some example embodiments, after monitoring generation of a push message, a terminal acquires relevant information of the push message and sends the same to a server, the information includes: a Push jump target, an identifier of the push message (Push id or PushId), copy, whether a push message is resident on the notification bar, and an application generating Push. In some example embodiments, the terminal sends the information to the server in the form of the following table:

| Jump target | Push id | copy | whether a push message is resident on the notification bar | an application generating Push |
|---|---|---|---|---|

Figure 3:
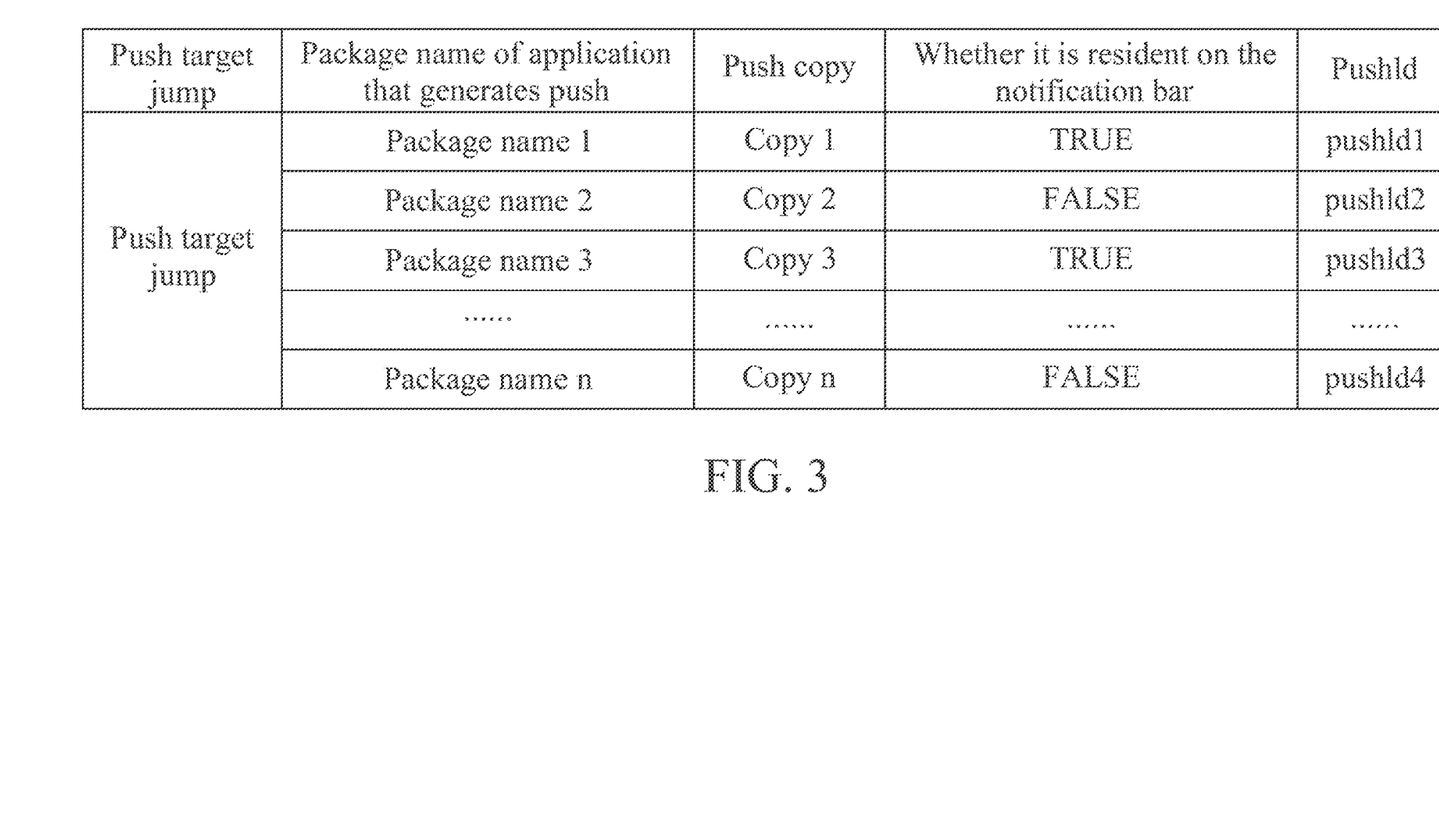
FIG. 3 is a schematic view of a storage manner of a push message according to an example embodiment.

The server receives the information of a plurality of push messages, stores the same according to the table in FIG. 3, then, performs classification pre-processing using a classification algorithm (for example, Bayes classification) on the basis preset keywords and the copy of the push message, and obtains the suggestion type corresponding to the push message. It should be noted that, when the copy is pre-processed and classified, the classification algorithm is not limited to Bayes classification, and other classification algorithms may also be used, for example, LR algorithm and decision tree algorithm. The copy may be text information, picture, and/or network link contained in a push message.

Figure 4:
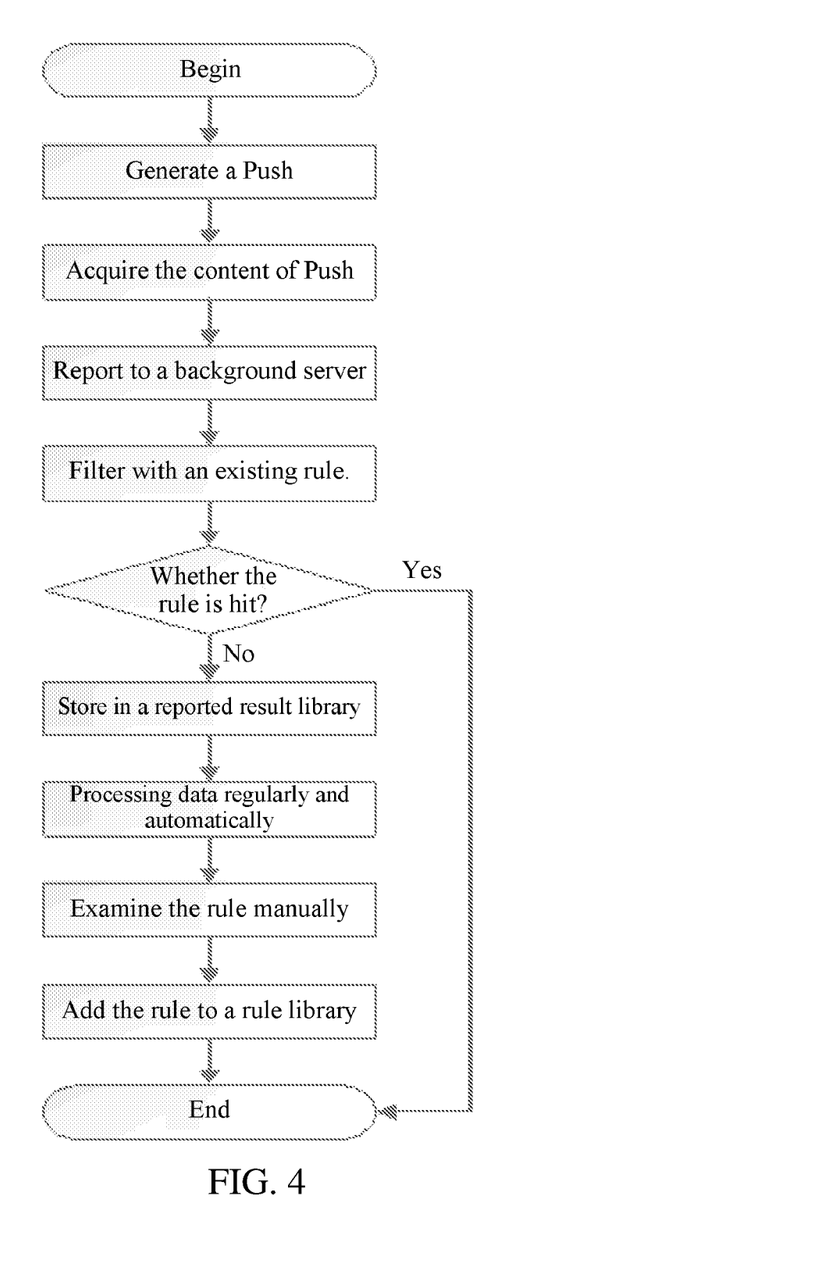
FIG. 4 is a flow chart of establishing a preset rule library according to an example embodiment.

Meanwhile, according to the interface identifier of a jump target interface, the server determines the suggestion type corresponding to the push message preliminarily (the specific determination method may also be a method of determining a classification algorithm according to the keywords of the preset interface identifier), if the suggestion type determined according to the copy of the push message is the same as the suggestion type determined according to the jump target, the suggestion type is determined as the corresponding type, if they are not the same, the type of the pre-processed push message needs to be examined manually, so as to determine the corresponding type. FIG. 4 is a flow chart of establishing a preset rule library.

Furthermore, when the formed correspondence relationship is confirmed, if the interface identifiers of the jump target interfaces corresponding to the push messages of a plurality of applications are the same, the push messages corresponding to the interface identifier are considered to be messages relating to SDK, and the interface identifier is extracted as the interface identifier corresponding to SDK.

When the server stores a plurality of correspondence relationships (that is, a plurality of Push rules) between interface identifiers and types, the terminal detects a push message, acquires the content information of the push message (including the interface identifier), and sends to the server, if the server does not store the interface identifier, the push message is stored into a result library, and the server processes the data in the result library automatically and regularly to form the type corresponding to the interface identifier, and adds the type to the rule library after manual examination for future use.

When the terminal requests for the correspondence relationship of an application identifier from the server, the server acquires, from the rule library, the first correspondence relationship corresponding to the corresponding application identifier, and the second correspondence relationship corresponding to the application associated SDK.

S202: Detect the target message received by the terminal notification bar.

Step S202 in this example embodiment may be referred to from step S100 in the example embodiment of FIG. 1, and will not be repeated herein.

In some example embodiments, the method further includes steps S203-S205.

S203: Acquire a target identifier of a target application that pushes the target message.

In this example embodiment, when the target type of the target message is determined, the target identifier of the target application that pushes the target message may be acquired, and the target identifier of the target application may be the package name of the target application.

S204: Determine whether the preset rule library has an application identifier matching the target identifier.

S205: If the preset rule library has an application identifier matching the target identifier, determine the message identifier matching the target message according to the matched application identifier.

In this example embodiment, the determining the message identifier matching the target message according to the matched application identifier may include searching the first correspondence relationship of the matched application identifier to determine whether a message identifier matching the target message exists, and if the message identifier matching the target message exists, determining the message type corresponding to the matched message identifier as the type of the target message.

In this example embodiment, when the target identifier matches a certain application identifier in the rule library, the method further includes searching the first correspondence relationship of the matched application identifier to determine whether a message identifier matching the target message exists, if the message identifier matching the target message exists, determining the message type corresponding to the matched message identifier as the type of the target message. If no message identifier matching the target message exists in the first correspondence relationship, the target message may possibly be an SDK associated push message, and the preset interface identifiers in the preset rule library need to be used for further matching.

S206: If the rule library has no application identifier matching the target identifier, acquire the target interface identifier contained in the target message.

S207: Determine the type of the target message according to the target interface identifier.

Matching may be performed between the target interface identifiers and at least one preset interface identifier in the preset rule library, and the message type corresponding to the preset interface identifier that matches is determined as the type of the target message.

S208: Display the target message in the notification bar according to the type of the target message.

Steps S206-S208 in this example embodiment may be referred to from steps S101-S103 in the example embodiment of FIG. 1, and will not be repeated herein.

In some example embodiments, if the target interface identifier matches the preset interface identifier in the second correspondence relationship of the preset rule library, the method further includes step S209.

S209: If detecting a prohibition push instruction of a user for the target message, determining a plurality of applications associated with the SDK in the second correspondence relationship, and controlling the plurality of applications and prohibiting the plurality of applications from pushing the target message.

In this example embodiment, if the target interface identifier matches the preset interface identifier in the second correspondence relationship in the preset rule library, the target message is an SDK associated push message, if a prohibition push instruction of a user for the target message is detected, a plurality of applications associated with SDK in the second correspondence relationship is acquired, and the plurality of applications is controlled to be prohibited from pushing the target message, and in this way, a user does not need to prohibit all relevant applications from pushing the target message manually, and it is very convenient.

In this example embodiment, a target message received by a terminal notification bar is detected, a target interface identifier contained in the target message is acquired, a type of the target message is determined according to the target interface identifier, a target message is displayed in the notification bar according to the type of the target message, and the method determines the target type of a target message according to the target interface identifier, does not limit the existence form of the target message, and has a high accuracy rate.

Figure 5:
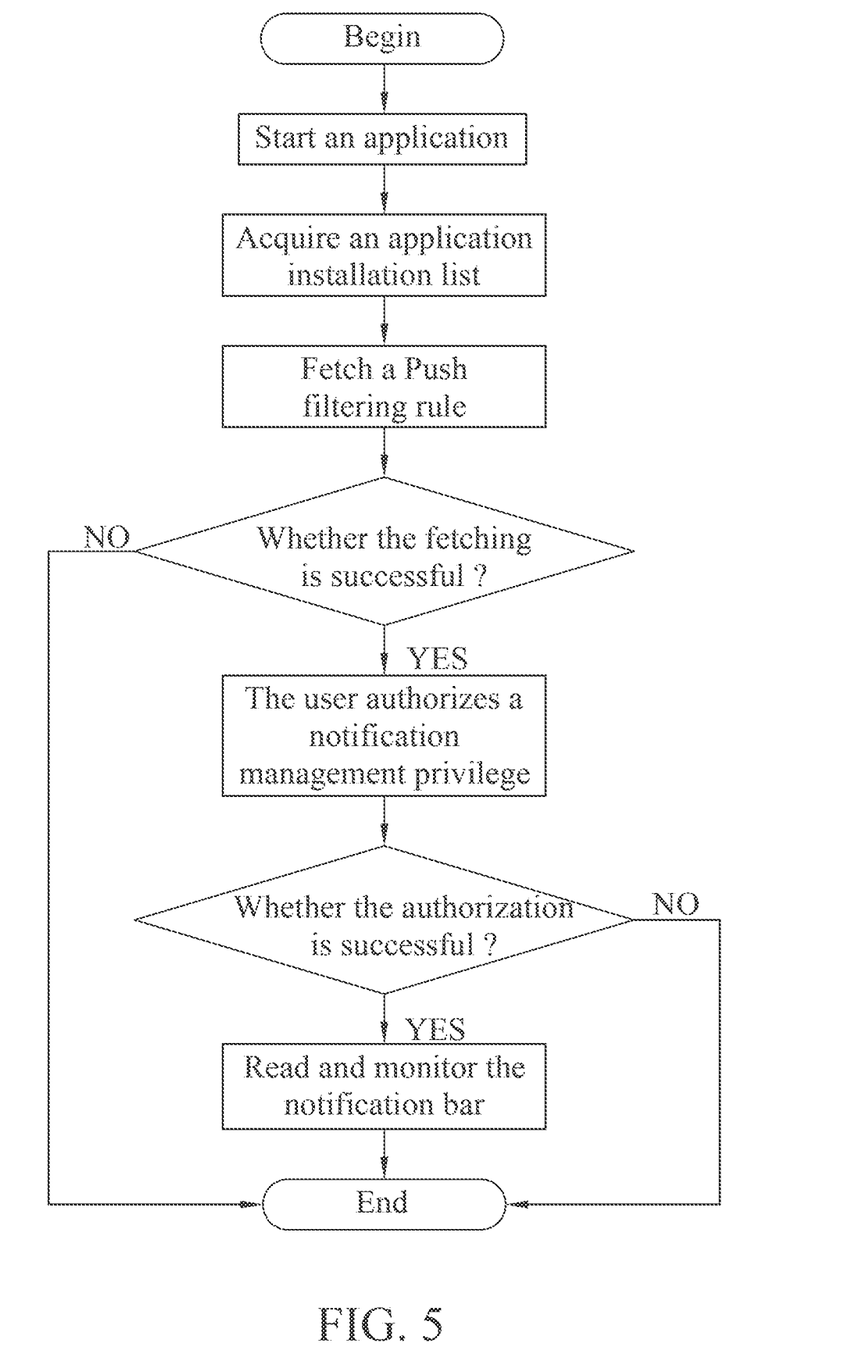
FIG. 5 is a flow chart of processing a notification bar message according to an example embodiment.

Referring to FIG. 5, FIG. 5 is a flow chart of processing a notification bar message according to an example embodiment. As shown in FIG. 5, (1) after a notification management tool application of a terminal is started, an installed application list is acquired according to the system interface, then, the application list is reported to a background, and a Push rule corresponding to the application is fetched (that is, a list of the correspondence relationships of interface identifiers and types).

(2) After receiving a terminal request, the server, according to the package name, searches the rule library for the rules corresponding to each package name, and delivers the rules to the terminal.

(3) In the notification management tool, a user is guided to authorize "notification management privilege" to the notification management tool.

(4) After the rule of the application is fetched successfully and the tool is authorized, the Push information in the current notification bar is read and intelligently classified, and the Push which will appear in future is monitored.

(5) Then, classified display and folding processing are performed according to a level of Push.

Figure 6:
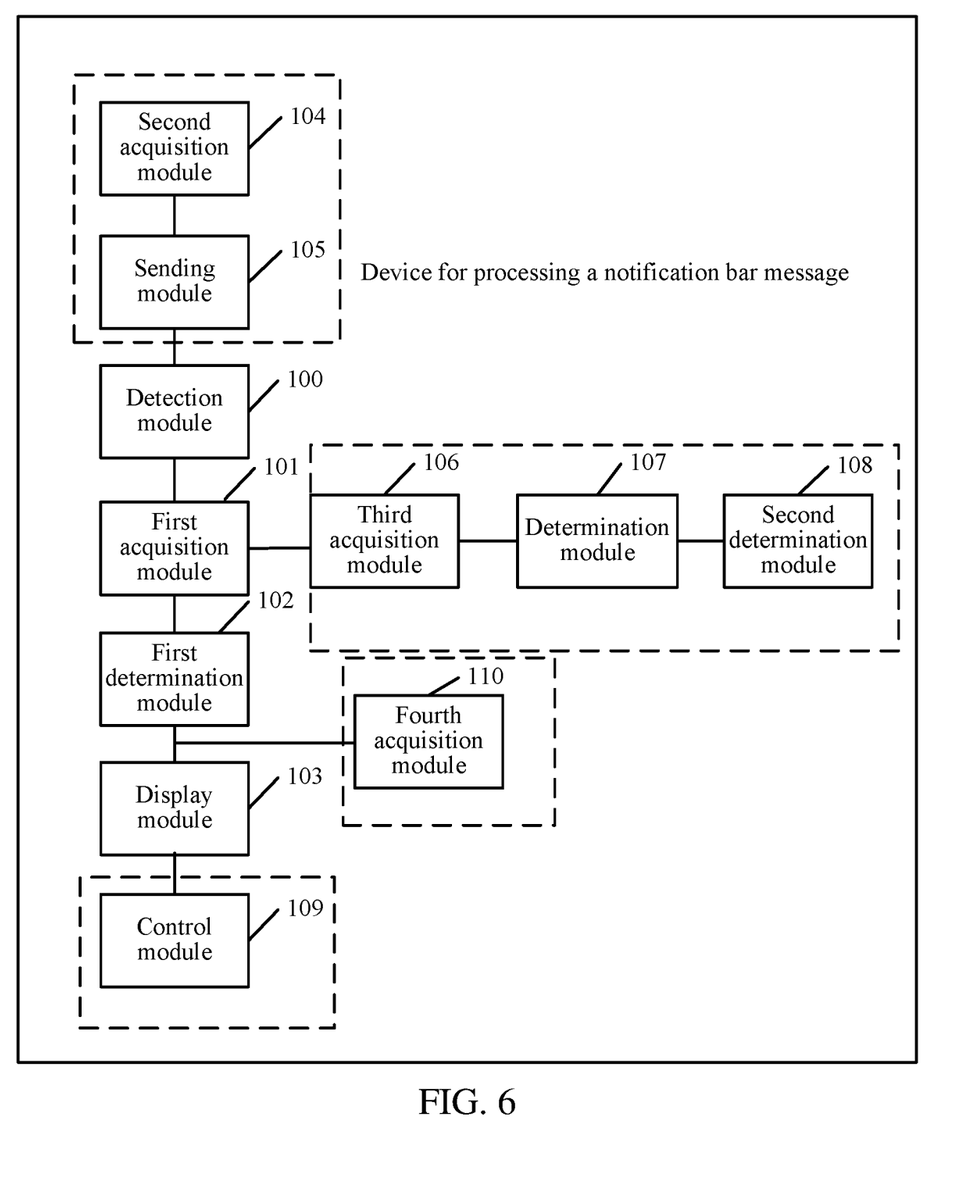
FIG. 6 is a structural diagram of a device for processing a notification bar message according to an example embodiment.

Referring to FIG. 6, a device for processing a notification bar message disclosed in an example embodiment is described in detail.

Referring to FIG. 6, FIG. 6 is a structural diagram of a device for processing a notification bar message according to an example embodiment. As shown in FIG. 6, the device for processing a notification bar message includes a detection module 100, a first acquisition module 101, a first determination module 102, and a display module 103.

The detection module 100 is configured to detect a target message received by a terminal notification bar.

Various applications installed in a terminal may push a target message to a notification bar of the terminal, and the message may include text information, pictures or network link, so as to trigger a user to click interested content. It should be noted that, the target message may be either a push message relating to an application of the terminal, or a push message relating to SDK integrated with the terminal.

In this example embodiment, the terminal may be a portable terminal device or a mobile terminal device such as a mobile phone, a PAD (tablet PC), and an intelligent wearable device. Application programs may be installed and running in the terminal, and include, but not limited to, SNS (Social Networking Services) application programs and instant communications application programs.

The first acquisition module 101 is configured to acquire the target interface identifier contained in the target message.

The target message is usually configured to exhibit relatively short information and attracts the attention of a user, so as to guide the user to a specific functional interface. The user may click or delete the target message displayed in the terminal notification bar, and when the user clicks the target message displayed in the notification bar, the terminal will automatically jump to the functional interface (that is, the target interface or jump target interface) corresponding to the message. One example of the functional interface is webpage.

After it is detected that the terminal notification bar receives the target message, the first acquisition module 101 acquires the target interface identifier corresponding to the target interface that will be jumped to and determined by the target message, and the target interface identifier may include a package name and a type name of the target interface. The target interface identifier is usually contained in the target message.

For an Android operating system, such target jump is packaged into a PendingIntent structure, which stores Intent that will be trigged when the user triggers clicking and canceling of the push message. For a push message, no matter which application is the sender, the identity of the application that pushes the message may possibly be changed, but the target jump corresponding to the message will not be changed. Therefore, the target jump of the push message may be judged as a main factor of classifying the type of the push message.

An example that applications send push messages to one another is taken for further description. The terminal is installed with an application A and an application B, the manufacturers of the application A and the application B cooperate with each other, the messages pushed by the application A and the application B all jump to a functional interface of the application B. Therefore, the source of a certain push message received by the notification bar may be either the application A or the application B. However, no matter who sends the message, the message will finally jump to the functional interface in the application B. Therefore, this example embodiment acquires the target interface identifier contained in the push message.

Furthermore, in some example embodiments, which application sends the push message may be distinguished according to the package name in the target interface identifier.

The first determination module 102 is configured to determine the type of the target message according to the target interface identifier.

In this example embodiment, matching may be performed between target interface identifiers and at least one preset interface identifier in the preset rule library, and the message type corresponding to the preset interface identifier that matches is determined as the type of the target message.

The preset rule library includes a correspondence relationship between preset interface identifiers and message types. It should be noted that, each correspondence relationship may be a first correspondence relationship or a second correspondence relationship. The preset interface identifier in the first correspondence relationship matches the interface identifier contained in the push message relating to the application installed in the terminal; the preset interface identifier in the second correspondence relationship matches the interface identifier contained in the push message relating to the SDK integrated with the terminal. Therefore, if the target interface identifier matches the preset interface identifier of the first correspondence relationship, it may be determined that the target message is the push message of the application installed in the terminal; if the target interface identifier matches the preset interface identifier of the second correspondence relationship, it may be determined that the target message is a push message of the SDK integrated with the terminal.

The correspondence relationships in the preset rule library may all be the first correspondence relationship, or the second correspondence relationship, or include both the first correspondence relationships and the second correspondence relationships. It should be noted that, the first correspondence relationship and the second correspondence relationship in this example embodiment are only for distinguishing types of the correspondence relationships, the first correspondence relationship and the second correspondence relationship are distinguished in the preset rule library mainly to determine the initial source of a certain push message, that is, whether it comes from an application or SDK.

The type of the message in the preset rule library corresponding to the preset interface identifier that matches the target interface identifier is determined as the type of the target message.

The type of the push message may be classified according to various standards, for example, firstly, according to whether a push message is resident in the notification bar, the push message may be classified as a resident type and a cleanable type; then, further according to the use of the push message, the push message may be classified as a system type, a function type, an information type, an instant communications type, and an advertisement type, and each type further has the following small types:

| | |
|---|---|
| System type | electricity, network, storage space, privilege, safety |
| Function type | reminding, commission, mail, weather, road condition, navigation, finance, schedule, application update, download |
| Information type | news, read, video, information |
| Instant communications type | short message, instant communications message, social trends, commend reminding |
| Advertisement type | advertisement, sales promotion, recommendation |

In some example embodiments, the types of the push messages in this example embodiment may be either the small types or the large types (that is, system type, function type, information type, instant communications type, and advertisement type) in the aforementioned table.

The display module 103 is configured to display the target message in the notification bar according to the type of the target message.

In this example embodiment, different types of target messages are corresponding to different display modes, and the target message may be displayed in the notification bar according to the target type of the target message, for example, folded display and separately display. It should be noted that display modes corresponding to different types need to be set in advance.

In some example embodiments, the device for processing a notification bar message further includes a second acquisition module 104 and a sending module 105.

The second acquisition module 104 is configured to acquire at least one application installed in the terminal.

In this example embodiment, the second acquisition module 104 acquires the application list installed in the terminal according to the system interface, and the application list includes at least one application.

In some example embodiments, the terminal has a notification management tool application program, after the notification management tool application program is started, the application list that has been installed in the terminal is acquired according to the system interface, and the application list includes at least one application.

The sending module 105 is configured to send the application identifiers of the at least one application to a server, so that the server establishes a preset rule library, wherein the preset rule library includes at least one first correspondence relationship of each of the at least one application and a second correspondence relationship of SDK associated with a plurality of applications among the at least one application.

In this example embodiment, the terminal sends the application identifier of at least one application in the application list to the server, so that the server establishes the preset rule library, and the application identifier may be the package name of the application.

The server stores a lot of correspondence relationships between interface identifiers (that is, Push jump targets) and message types. In some example embodiments, besides the Push jump targets and message types, the correspondence relationship may include the following content: package name, identifiers of push messages (Push id), whether a push message is sent by SDK, and default suggestion. In some example embodiments, the correspondence relationship may be organized according to the following table:

| Push jump target | package name list | type | default suggestion | Push id | whether a push message is sent by SDK |
|---|---|---|---|---|---|
| | | | | | |

In some example embodiments, after monitoring generation of a push message, a terminal acquires relevant information of the push message and sends the same to a server, the information includes: a Push jump target, an identifier of the push message (Push id or PushId), copy, whether a push message is resident on the notification bar, and an application generating Push. In some example embodiments, the terminal sends the information to the server in the form of the following table:

| Jump target | Push id | copy | whether a push message is resident on the notification bar | an application generating Push |
|---|---|---|---|---|
| | | | | |

As shown in FIG. 3, the server receives the information of a plurality of push messages, stores the same, then, performs classification pre-processing using a classification algorithm (for example, Bayes classification) on the basis preset keywords and the copy of the push message, and obtains the suggestion type corresponding to the push message. It should be noted that, when the copy is pre-processed and classified, the classification algorithm is not limited to Bayes classification, and other classification algorithms may also be used, for example, LR algorithm and decision tree algorithm. The copy may be text information, picture, and/or network link contained in the push message.

Meanwhile, according to the interface identifier of a jump target interface, the server determines the suggestion type corresponding to the push message preliminarily (the specific determination method may also be a method of determining a classification algorithm according to the keywords of the preset interface identifier), if the suggestion type determined according to the copy of the push message is the same as the suggestion type determined according to the jump target, the suggestion type is determined as the corresponding type, if they are not the same, the pre-processed push message needs to be examined manually, so as to determine the corresponding type.

Furthermore, when the formed correspondence relationship is confirmed, if the interface identifiers of the jump target interfaces corresponding to the push messages of a plurality of applications are the same, the push messages corresponding to the interface identifier are SDK associated messages, and the interface identifier is extracted as the interface identifier corresponding to SDK.

As shown in FIG. 4, when the server stores a plurality of correspondence relationships (that is, a plurality of Push rules) between interface identifiers and types, the terminal detects a push message, acquires the content information of the push message (including the interface identifier), and sends to the server, if the server does not store the interface identifier, the push message is stored into a result library, the server processes the data in the result library automatically and regularly to form the types corresponding to the interface identifier, and adds the types to the rule library after manual examination for future use.

When the terminal requests for the correspondence relationship of an application identifier from the server, the server acquires, from the rule library, the first correspondence relationship corresponding to the application identifier, and the second correspondence relationship corresponding to the application associated SDK.

In some example embodiments, the device for processing a notification bar message further includes a third acquisition module 106, a determination module 107, and a second determination module 108.

The third acquisition module 106 is configured to acquire a target identifier of a target application that pushes the target message.

In this example embodiment, when the target type of the target message is determined, the target identifier of the target application that pushes the target message is acquired, and the target identifier of the target application may be the package name of the target application.

The determination module 107 is configured to determine whether the preset rule library has an application identifier matching the target identifier.

The second determination module 108 is configured to, if the preset rule library has an application identifier matching the target identifier, determine the message identifier matching the target message according to the matched application identifier.

In this example embodiment, the determining the message identifier matching the target message according to the matched application identifier may include searching the first correspondence relationship of the matched application identifier to determine whether a message identifier matching the target message exists, and if the message identifier matching the target message exists, determining the message type corresponding to the matched message identifier as the type of the target message.

In this example embodiment, when the target identifier matches a certain application identifier in the rule library, the method further includes searching the first correspondence relationship of the matched application identifier to determine whether a message identifier matching the target message exists, if the message identifier matching the target message exists, determining the message type corresponding to the matched message identifier as the type of the target message. If no message identifier matching the target message exists in the first correspondence relationship, the target message may possibly be a push message relating to SDK, and the preset interface identifier in the preset rule library needs to be used for further matching.

The first acquisition module 101 is specifically configured to acquire the target interface identifier contained in the target message if the rule library has no application identifier matching the target identifier.

In some example embodiments, if the target interface identifier matches the preset interface identifier in the second correspondence relationship in the preset rule library, the device for processing a notification bar message further includes a control module 109.

The control module 109 is configured to, if detecting a prohibition push instruction of a user for the target message, determine a plurality of applications associated with the SDK in the second correspondence relationship, and control the plurality of applications and prohibit the application from pushing the target message.

In this example embodiment, if the target interface identifier matches the preset interface identifier in the second correspondence relationship in the preset rule library, the target message is a push message relating to SDK, if a prohibition push instruction of a user for the target message is detected, a plurality of applications associated with SDK in the second correspondence relationship is acquired, and the control module 109 controls the plurality of applications and prohibit the applications from pushing the target message, and in this way, a user does not need to prohibit all relevant applications from pushing the target message, and it is very convenient.

In some example embodiments, the device for processing a notification bar message further includes a fourth acquisition module 110.

The fourth acquisition module 110 is configured to determine the display priority level corresponding to the type of the target message.

The display priority level may include high priority level or low priority level.

The display module 103 is specifically configured to combine, fold, and display the target message and other messages in the notification bar if the display priority level corresponding to the type of the target message is a low priority level, wherein the type of the other message is the same as the type of the target message.

The target message is displayed directly in the notification bar if the display priority level corresponding to the type of the target message is a high priority level.

In this example embodiment, priority levels corresponding to different types are set in advance. For example, push messages of the advertisement and information types that often disturb a user have a low priority, the priority levels of the instant communications, system and function types are high. It should be noted that, if the type of a target message is a small type under the large types such as the system, function, information, instant communications, and advertisement types, when the priority level is determined, the large type corresponding to the small type of the target message needs to be determined, so as to determine the priority level of the type of the target message.

In this example embodiment, a terminal may report operations made by a user on a push message to a server, and the server adjusts the priority levels of each type according to the statistics of the use state of a user. For example, when a lot of users select to cancel (not care about) a certain type of push messages, the priority level of the type of push messages is lowered; when a lot of users select to click (care about) a certain type of push messages, the priority level of the type of push messages is raised. When the priority levels of each type are adjusted, a percentile measure may be used, and the value is the percentage of users caring about the type of push messages, and ranges from 0-100. When the percentage of users caring about a certain type of push messages is larger than a preset threshold (for example, 50%), the priority level of the type of push messages is raised. The server sends the priority levels of each type that are re-determined to the terminal.

If the display priority level corresponding to the type of the target message is a low priority level, the target message and other messages are combined to be folded and displayed in the notification bar, combining to be folded and displayed is combining the target message and other messages in one notification bar to be displayed, the notification bar only displays the total number of the target message and other messages and the applications or SDK from which the messages are, and only when the user clicks the notification bar, the content of each message will be displayed separately.

If the display priority level corresponding to the type of a target message is a high priority level, the target message is displayed in the notification bar directly, that is, the content of the target message is displayed in the notification bar, and the user may acquire the content of the target message from the notification bar directly.

In some example embodiments, the method for processing a notification bar message may be performed and implemented by a third-party application management type application program. In some example embodiments, the push messages relating to SDK are pushed by SDK associated applications relating.

In this example embodiment, a target message received by a terminal notification bar is detected, a target interface identifier contained in the target message is acquired, a type of the target message is determined according to the target interface identifier, a target message is displayed in the notification bar according to the type of the target message, and the method determines the target type of a target message according to the target interface identifier, does not limit the existence form of the target message, and has a high accuracy rate.

A person of ordinary skill in the art would understand that all or partial flows in the aforementioned method in the aforementioned example embodiments may be implemented by computer programs instructing some hardware, and the programs may be stored in a computer readable storage medium. The program corresponding to the device for processing a notification bar message in FIG. 6 may be stored in a readable storage medium of the terminal (and/or server), and executed by at least one processor in the terminal (and/or server), so as to realize the method for processing a notification bar message. The method includes the flows described in method example embodiment in FIG. 1 and FIG. 2. The storage medium may be a magnetic disc, an optical disc, a Read-Only Memory (ROM), or a Random Access Memory (RAM).

The above descriptions are merely example embodiments, and certainly are not intended to limit the scope of the present disclosure. Therefore, the equivalent changes made according to the claims of the present disclosure still fall in the scope of the present disclosure and the appended claims.

What is claimed is:
1. A method comprising:
   detecting a target message received by a terminal notification bar;
   based on detecting the target message, acquiring a target interface identifier contained in the received target message, the target interface identifier corresponding to a jump target interface of an application, whose interface will be jumped to upon actuation of the target message by a user;
   determining the jump target interface from the target interface identifier;
   determining a type of the target message based on the jump target interface; and
   displaying the target message in the notification bar using a display mode according to the type of the target message.

2. The method according to claim 1, wherein the determining comprises:
   performing matching between the target interface identifier and interface identifiers in a rule library to find a matched interface identifier, wherein the rule library comprises a plurality of correspondence relationships between interface identifiers and message types, and
   determining a message type corresponding to the matched interface identifier as the type of the target message.

3. The method according to claim 2, wherein each of the plurality of correspondence relationships is a first correspondence relationship or a second correspondence relationship;
   the target message is determined as a push message of an application installed in a terminal if the matched interface identifier is of a first correspondence relationship; and
   the target message is determined as a push message of a software development kit (SDK) integrated with a terminal if the matched interface identifier is of a second correspondence relationship.

4. The method according to claim 1, wherein before the detecting, the method further comprises:
   acquiring at least one application installed by a terminal;
   sending an application identifier of each of the at least one application to a server for establishing a rule library,
   wherein the rule library comprises first correspondence relationships of each of the at least one application with interface identifiers, and/or a second correspondence relationship of an SDK associated with one or more applications among the at least one application.

5. A method comprising:
   detecting a target message received by a terminal notification bar;
   acquiring a target interface identifier contained in the target message;
   determining a type of the target message based on the target interface identifier; and
   displaying the target message in the notification bar using a display mode according to the type of the target message,
   wherein before acquiring the target interface identifier, the method further comprises:
   acquiring a target identifier of a target application that pushes the target message;
   determining whether a rule library includes an application identifier matching the target identifier;
   if the rule library includes an application identifier matching the target identifier, determining a message identifier matching the target message according to the matched application identifier, and determining a message type corresponding to the matched message identifier as a type of the target message; and if the rule library does not include an application identifier matching the target identifier, acquiring a target interface identifier contained in the target message.

6. The method according to claim 4, wherein if the target interface identifier matches an interface identifier in the second correspondence relationship of the rule library, the method further comprises:

determining a plurality of applications associated with an SDK in the second correspondence relationship, and controlling the plurality of applications and prohibiting the plurality of applications from pushing the target message in response to detecting a prohibition push instruction for the target message.

7. The method according to claim 1, wherein before the displaying, the method further comprises:

determining a display priority level corresponding to a type of the target message, wherein the display priority level comprises a high priority level or a low priority level, wherein the displaying the target message comprises:

if the display priority level is a low priority level, combining, folding, and displaying the target message in the notification bar, and combining, folding and displaying other messages in the notification bar when a type of the other message is the same as a type of the target message; and if the display priority level is a high priority level, directly displaying the target message in the notification bar.

8. A device comprising:

at least one memory configured to store computer program code; and at least one processor configured to access the at least one memory and operate according to the computer program code, the computer program code including:

detection code configured to cause the at least one processor to detect a target message received by a terminal notification bar;

first acquisition code configured to cause the at least one processor to, based on detecting the target message, acquire a target interface identifier contained in the received target message, the target interface identifier corresponding to a jump target interface of an application whose interface will be jumped to upon actuation of the target message by a user;

first determination code configured to cause the at least one processor to determine the jump target from the target interface identifier, and determine a type of the target message based on the jump target interface;

display code configured to cause the at least one processor to display the target message in the notification bar using a display mode according to the type of the target message.

9. The device according to claim 8, wherein the first determination code comprises:

matching code configured to cause the at least one processor to perform matching between the target interface identifier and interface identifiers in a rule library to find a matched interface identifier, wherein the rule library comprises a plurality of correspondence relationships between interface identifiers and message types, and second determination code configured to cause the at least one processor to determine a message type corresponding to the matched interface identifier as the type of the target message.

10. The device according to claim 9, wherein each of the plurality of correspondence relationships is a first correspondence relationship or a second correspondence relationship;

the target message is determined as a push message of an application installed in a terminal if the matched interface identifier is of a first correspondence relationship; and the target message is determined as a push message of a software development kit SDK integrated with a terminal if the matched interface identifier is of a second correspondence relationship.

11. The device according to claim 8, further comprising:

a second acquisition code configured to cause the at least one processor to acquire at least one application installed in a terminal;

a sending code configured to cause the at least one processor to send an application identifier of each of the at least one application to a server for establishing a rule library, wherein the rule library comprises first correspondence relationships of each application of the at least one application with interface identifiers, and/or a second correspondence relationship of an SDK associated with one or more applications among the at least one application.

12. A device comprising:

at least one memory configured to store computer program code; and at least one processor configured to access the at least one memory and operate according to the computer program code, the computer program code including:

detection code configured to cause the at least one processor to detect a target message received by a terminal notification bar;

first acquisition code configured to cause the at least one processor to acquire a target interface identifier contained in the target message;

first determination code configured to cause the at least one processor to determine a type of the target message based on the target interface identifier;

display code configured to cause the at least one processor to display the target message in the notification bar using a display mode according to the type of the target message, further comprising:

second acquisition code configured to cause the at least one processor to acquire a target identifier of a target application that pushes the target message;

rule library determination code configured to cause the at least one processor to determine whether a rule library includes an application identifier matching the target identifier;

second determination code configured to cause the at least one processor to, if the rule library includes an application identifier matching the target identifier, determine a message identifier matching the target message according to the matched application identifier, and determine a message type corresponding to the matched message identifier as a type of the target message; and if the rule library does not include application identifier matching the target identifier, the first acquisition module is configured to cause the at least one processor to acquire a target interface identifier contained in the target message.

13. The device according to claim 11, wherein if the target interface identifier matches an interface identifier in the second correspondence relationship of the rule library, the device further comprises:

a control code configured to cause the at least one processor to determine a plurality of applications associated with an SDK in the second correspondence relationship in response to detecting a prohibition push instruction for the target message, and prohibit the one or more applications from pushing the target message.

14. The device according to claim 8, wherein the device further comprises:
a fourth acquisition code configured to cause the at least one processor to determine a display priority level corresponding to a type of the target message, wherein the priority level comprises a high priority level or a low priority level;
wherein the display module is specifically configured to cause the at least one processor to:
if the display priority level is a low priority level, combine, fold, and display the target message in the notification bar, and combined, fold, and display other messages in the notification bar when a type of the other message is the same as a type of the target message; and
if the display priority level is a high priority level, display the target message directly in the notification bar.

15. A non-transitory computer readable storage medium, storing a program which, when executed by a processor of a computation device, performs operations comprising
detecting a target message received by a terminal notification bar;
based on detecting the target message, acquiring a target interface identifier contained in the received target message, the target interface identifier corresponding to a jump target interface of an application whose interface will be jumped to upon actuation of the target message by a user;
determining the jump target interface from the target interface identifier;
determining a type of the target message based on the jump target interface; and
displaying the target message in the notification bar using a display mode according to the type of the target message.

16. The non-transitory computer readable storage medium according to claim 15, wherein the determining comprises:
performing matching between the target interface identifier and interface identifiers in a rule library to find a matched interface identifier, wherein the rule library comprises a plurality of correspondence relationships between interface identifiers and message types, and
determining a message type corresponding to the matched interface identifier as the type of the target message.

17. The non-transitory computer readable storage medium according to claim 16, wherein each of the plurality of correspondence relationships is a first correspondence relationship or a second correspondence relationship;
the target message is determined as a push message of an application installed in a terminal if the matched interface identifier is of a first correspondence relationship; and
the target message is determined as a push message of a software development kit (SDK) integrated with a terminal if the matched interface identifier is of a second correspondence relationship.

18. The non-transitory computer readable storage medium according to claim 15, wherein before the detecting, the operations further comprise:
acquiring at least one application installed by a terminal;
sending an application identifier of each of the at least one application to a server for establishing a rule library,
wherein the rule library comprises first correspondence relationships of each of the at least one application with interface identifiers, and/or a second correspondence relationship of an SDK associated with one or more applications among the at least one application.

19. The non-transitory computer readable storage medium according to claim 18, wherein if the target interface identifier matches an interface identifier in the second correspondence relationship of the rule library, the method further comprises:
determining a plurality of applications associated with an SDK in the second correspondence relationship, and
controlling the plurality of applications and prohibiting the plurality of applications from pushing the target message in response to detecting a prohibition push instruction for the target message.

20. The non-transitory computer readable storage medium according to claim 15, wherein before the displaying, the operations further comprise:
determining a display priority level corresponding to a type of the target message, wherein the display priority level comprises a high priority level or a low priority level,
wherein the displaying the target message comprises:
if the display priority level is a low priority level, combining, folding, and displaying the target message in the notification bar, and combining, folding and displaying other messages in the notification bar when a type of the other message is the same as a type of the target message; and
if the display priority level is a high priority level, directly displaying the target message in the notification bar.

* * * * *